G. BRYAR.
SLOTTING MACHINE.
APPLICATION FILED APR. 1, 1908.
1,127,180.
Patented Feb. 2, 1915.
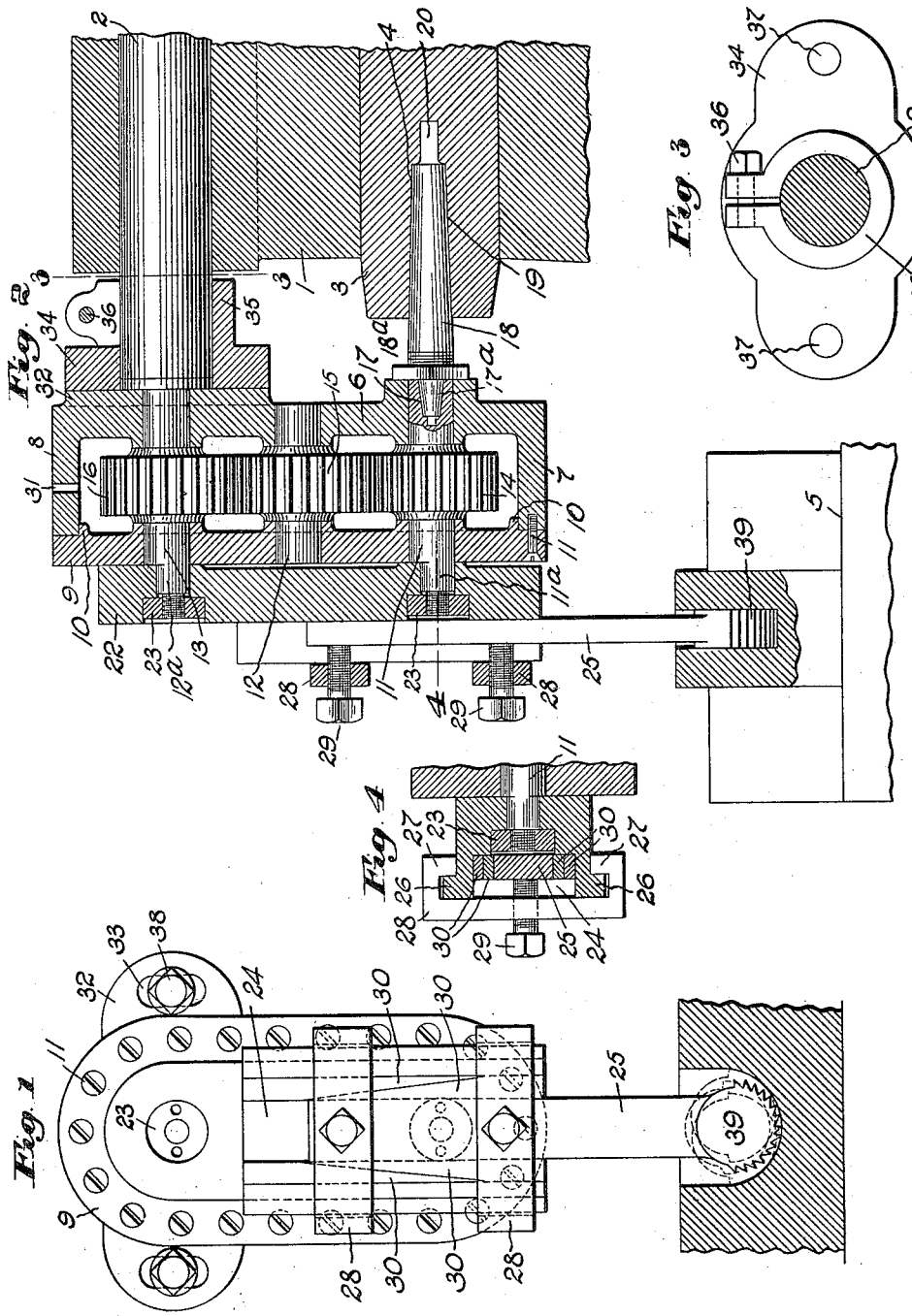
Witnesses:
Horace H. Crossman
Robert H. Kammler
Inventor:
George Bryar.
by Emery & Booth
Attys

UNITED STATES PATENT OFFICE.

GEORGE BRYAR, OF BOSTON, MASSACHUSETTS, ASSIGNOR TO JOHN RUSH GREEN, OF SOMERVILLE, MASSACHUSETTS.

SLOTTING-MACHINE.

1,127,180.   Specification of Letters Patent.   Patented Feb. 2, 1915.

Application filed April 1, 1908. Serial No. 424,474.

*To all whom it may concern:*

Be it known that I, GEORGE BRYAR, a citizen of the United States, residing at Boston, in the county of Suffolk, Commonwealth of Massachusetts, have invented an Improvement in Slotting-Machines, of which the following description, in connection with the accompanying drawings, is a specification, like letters on the drawings representing like parts.

This invention relates to devices for forming apertures in metal and the like, and has special reference to devices for cutting non-circular apertures. Heretofore, in order to cut such an aperture in metal it has been common first to drill a hole at the desired point and then, by means of a milling or slotting tool, enlarge this opening, giving it the required outline, by cutting away the wall of the original opening in one or more directions. This process is slow and necessitates one adjustment of the work for drilling the first hole and additional adjustments and the use of a feeding device, and substitution also of a new tool, for enlarging the opening.

My invention comprises a device for cutting a non-circular opening without resort to the expedients above-mentioned and the invention will be best understood from one embodiment thereof to be described.

In the embodiment of my invention selected for illustration herein,—Figure 1 is a front view of a device comprising my invention, showing the cutting tool in position in an opening cut thereby; Fig. 2 is a vertical sectional view of the same device attached to the usual milling machine partly broken away; Fig. 3 is a cross-sectional detail on the line 3—3, Fig. 2, showing the collar secured to the arm of the milling machine, to which my device is adapted to be adjustably secured; and, Fig. 4 is a partial cross section on the line 4—4, Fig. 2, looking down.

My device consists first of a removable supporting frame or head 6, see Fig. 2, adapted to be secured to the arm 2 of the usual milling machine, in which the end of the arm and a portion of the head of the milling machine are shown.

In order to secure the adjustable head 6 to the collar 34 the head is provided at its rear, and near the top, with the ears 32, slotted at 33 to receive screws 38, tapped into or extending through holes 37, 37 in the collar 34. The collar 34 is adapted to be secured upon the arm 2 of the milling machine. Inasmuch as the diameters of the arms of the milling machines vary, the laterally turned split flange 35 of the collar 34 is provided of a thickness that will permit it to be reamed out to fit the arm of the particular milling machine to be used, and the split flange is provided with a set screw 36 by means of which the collar may be securely clamped upon the arm 2.

As the distance between the spindle 3 and arm 2 of the milling machine varies according to the make of the particular machine, it is necessary that the head of the device may be secured to the arm 2 by some means capable of adjustment to the dimensions of the machine upon which it is to be used and this is accomplished by means of the slots 33, 33 which, while the position of the spindle 18 with respect to the spindle 3 of the milling machine must always be the same, permits the head to be secured to the collar, whatever be the distance of the collar from the spindle 3, within certain limits.

The adjustable head 6 comprises side and end members 7 and 8 and a front or face member 9 provided with the shoulder 10, adapted to be secured to the members 7 and 8 by screws 11$^b$ or any other suitable manner. The arbors 11, 12, 13 carrying gears 14, 15 and 16, in mesh with each other are journaled in the members 6 and 9 of the adjustable head. To transmit power to these gears the arbor 11 is provided at its rear end with the tapered socket 17 adapted to receive the correspondingly shaped end 17$^a$ of a spindle 18, the other end of which is tapered as at 19, to be received in a similarly tapered socket 4 in the end of the spindle 3. When the usual chuck is employed in place of a taper socketed spindle a suitable spindle 18 may be employed to be locked in the chuck. The spindle 18 is threaded and carries a nut 18$^a$ adapted to be screwed up against the end of the arbor 11 to secure a broad bearing surface for the nut and thus cause the spindle 18 to run true in the socket 17. The outer ends of the arbors 11, and 13 are formed to provide eccentrically disposed pivot members or cranks 11$^a$ and 12$^a$ to which a block, or tool holder 22 is removably secured by nuts 23. The block 22 is channeled at 24 to receive the shank 25 of the cutting tool, said block being also provided with the laterally extended lips 26 to receive the inturned flanges 27, 27 of the locking members 28, 28, which carry set screws 29, 29 by means of which the tool shank may be adjustably and securely locked in position in said channel. The tool is still further secured against lateral movement by the wedge-shaped members 30, 30 adapted to be driven in between the side of the tool shank and the wall of the channel, on each side.

The tool 25 is provided at its lower end with a semi-cylindrical cutting head 39, which in the present instance is provided with a concentric series of cutting teeth. As the tool approaches the work the center teeth will first engage the same. As the tool travels its curvilinear path down and toward the right, Fig. 1, the teeth will progressively engage the work from the center to the left-hand, Fig. 1, side of the tool. As the tool ascends the teeth will progressively engage the work from the center toward the right-hand, Fig. 1, side of the tool. It is obvious that the shape of the cutting head may be varied to cut openings of different outline.

If desired the gears 14, 15 and 16 may be run in oil, thus securing proper lubrication of the bearings and avoiding unnecessary wear of the gears. An opening 31 is provided for filling the adjustable head with oil.

The block of material to be slotted having been secured in position upon the universal or other table of the milling machine, and a cutting tool of proper size and shape having been secured in position upon the block 22, power is supplied from any convenient source and rotation of the spindle 3 thereupon acts through the gears 14, 15 and 16 to produce simultaneous and like rotation of the eccentrics or cranks 11$^a$ and 12$^a$, thus to cause the block 22 and the tool carried thereby to receive a vertical gyratory or compound motion. The work table is also gradually fed toward the tool.

When the work first meets the vertically gyratory tool only the lowest teeth of the tool will cut, but at each succeeding stroke of the tool, additional teeth engage the work and cut it away until a slot is made equal in length to the stroke of the eccentrics or cranks 11$^a$, 12$^a$ and the width of the cutting tool.

It will be evident that by suitably controlling the tool holder above the lowermost crank to permit relatively limited movement of the upper end of the tool holder the motion imparted to the cutting tool may be varied to produce a variety of differently shaped openings, as may be desired.

Claims:

1. A device for use in milling machines comprising a head, means thereon for adjustably securing the same to a machine, a tool holder, a tool provided with oppositely acting teeth, means for adjustably locking the same to the holder, a train of gears, simultaneously acting cranks connected thereto, and means connecting said cranks to a machine whereby cutting motion is imparted to the tool in a plurality of substantially parallel planes.

2. A device of the class described, comprising a frame adapted to be attached to a machine having a spindle provided with a tool holding socket, a shaft adapted to be inserted in the socket and driven thereby, two shafts journaled in the frame, means for synchronously driving said shafts by means of the first named shaft, cranks on said shafts, and a tool holder carried on said cranks.

3. In a milling machine a tool holder, a tool, means on the holder and locking the tool thereto determining the direction of the travel of the tool when it engages the work, a rotatable member operatively connected with one end of the holder, a combined guide and support for the opposite end of the holder, said guide with the rotatable member providing compound movement of the tool.

4. A device of the class described comprising a frame, adjustable means thereon for securing the frame to a machine provided with a spindle, a plurality of shafts in said frame, a tool holder carried by said shafts, and means for connecting one of said shafts to said spindle.

5. A device of the class described comprising a frame, means to secure the same to a milling machine, a train of substantially vertically disposed gears in said frame, means to impart motion thereto, cranks operatively connected with said gears, and a tool holder actuated by said cranks.

6. A device of the class described comprising a frame, means to secure the same to a milling machine, a plurality of shafts in said frame, gears carried by said shafts, one of said shafts adapted to be operatively connected with the source of power, cranks carried by a plurality of the shafts, a tool holder mounted on the cranks, a tool provided with a series of peripherally disposed cutting members adapted to cut progressively from the center of said series toward each end thereof.

7. A device adapted to be secured to a machine provided with a spindle and a supporting member substantially relatively vertically disposed, comprising a tool holder pivotally mounted relative to the machine supporting member and means whereby the tool holder may be eccentrically connected with the spindle, thereby imparting reciprocating motion to the tool in a curved path, and in a plane substantially vertical relative to the longitudinal axis of the spindle.

8. A milling device adapted to be attached to a milling machine comprising a tool, a tool holder, and means for eccentrically connecting the holder with the spindle of a milling machine and imparting motion to the tool.

9. A slotting device comprising a head, a train of gears therein having uniformly acting cranks, a tool holder carried by the cranks, a tool provided with a curvilinear cutting end, means for operatively connecting the axle of one of the gears to the spindle, and means for securing the head to the arm of a milling machine.

10. A milling device comprising a tool holder, a tool, means connecting the holder with a source of power and effecting travel of the tool in a plurality of substantially parallel paths and in a plane vertical to the axis of the power producing member.

11. A milling attachment comprising a support, a tool holder pivotally mounted thereon, means for connecting the holder eccentrically to a driving shaft and thereby producing compound movement of the tool.

In testimony whereof, I have signed my name to this specification, in the presence of two subscribing witnesses.

GEORGE BRYAR.

Witnesses:
FREDERIC GILBERT BAUER,
EVERETT S. EMERY.

Copies of this patent may be obtained for five cents each, by addressing the "Commissioner of Patents, Washington, D. C."